United States Patent [19]
Brandtjen

[11] 4,011,937
[45] Mar. 15, 1977

[54] APRON ATTITUDE ADJUSTMENT FOR LOADING AND CONVEYING MACHINES

[75] Inventor: Sheldon J. Brandtjen, Green Bay, Wis.

[73] Assignee: Northwest Engineering Company, Green Bay, Wis.

[22] Filed: Jan. 2, 1976

[21] Appl. No.: 646,011

[52] U.S. Cl. .............................. 198/517; 198/308; 198/522
[51] Int. Cl.² ........................................ B65G 41/02
[58] Field of Search ...................... 214/90 R, 90 A; 198/308, 517, 520, 522

[56] References Cited
UNITED STATES PATENTS

| | | | |
|---|---|---|---|
| 1,739,624 | 12/1929 | Whamond | 214/90 R |
| 3,547,287 | 12/1970 | Cunningham | 214/90 R |

*Primary Examiner*—Robert G. Sheridan
*Attorney, Agent, or Firm*—Andrus, Sceales, Starke & Sawall

[57] ABSTRACT

A loading and conveying machine has crawler treads and a frame extending substantially forwardly thereof. A conveyor is mounted for pivotal movement about a horizontal axis and extends rearwardly from ahead of the frame to the back of the machine. An apron is pivotally mounted at the front of the frame and receives material from a loading implement and deposits it onto the conveyor. The machine has an approach angle providing a space defined by a ground plane and a forwardly and upwardly inclined plane tangential to the arc described by the front of the treads and extending through the lower front frame corner. The apron is angularly adjustable, and furthermore, the apron pivot is vertically shiftable to thereby change the apron attitude so that it can be wholly positioned above the inclined approach plane without obstruction by the conveyor. In addition, by shifting the apron pivot, the apron-to-conveyor gap can be maintained at a desirable minimum through a large range of conveyor positions; and the dig-in angle of the apron is also adjustable.

12 Claims, 5 Drawing Figures

APRON ATTITUDE ADJUSTMENT FOR LOADING AND CONVEYING MACHINES

PRIOR ART OF INTEREST 990,487; Lilleberg; 4/25/11;
2,399,698; Stein; 5/7/46;
3,547,287; Cunningham; 12/15/70;
3,661,287 McCarty et al.; 5/9/72.

BACKGROUND OF THE INVENTION

This invention relates to apron attitude adjustment for loading and conveying machines.

Broadly, such machines utilize a front end gathering implement to sweep rock, sand, ore or other loose material onto a self-contained conveyor for transport to a discharge location, usually disposed at the rear of the machine. An apron is disposed at the forward conveyor end, has a front end edge adapted to move forwardly along the ground with the machine and a rear end portion spaced slightly above the conveyor to deposit material thereonto. The gathering implement is normally mounted to the front portion of the machine frame, extends substantially ahead of the apron and is adapted to force material up the inclined apron.

Vehicle transport means, such as crawler treads, support the machine on the ground and may be positioned substantially behind the apron and front frame portion to move the center of gravity of the entire device rearwardly in view of the substantial weight forces at the front.

The loading and conveying machines under consideration here can be utilized in tunneling operations, although it is contemplated that they may find more extensive use above ground. In any event, they are often subject to variations in level of terrain, both during actual loading and also during transport from place to place.

In order to accommodate rough terrain, and for transport purposes, it has been found desirable to pivotally mount the conveyor intermediate its ends and also to pivotally mount the rear of the apron to the machine frame and as low as possible. Pivotal adjustment of these elements has been accomplished by suitable hydraulic cylinders and the like.

It has been found that such machines will have difficulty in traversing rough terrain in that the front components of the machine will undesirably engage a hill or rise in the ground unless the components are properly positioned.

These machines have a basic "approach angle" defined by the level ground plane and a forwardly and upwardly inclined plane tangential to the arc described by the front of the treads and extending through the lower front frame corner. Except on flat ground, the angular space defined by these two planes must be kept clear of machine elements to avoid undesirable contact with ground undulations.

When rough terrain is to be encountered, the apron can be pivoted upwardly to clear the angular upper approach plane. However, it has been discovered that although the apron pivot is disposed above the approach plane, pivotal raising of the front end of the conveyor will cause the conveyor to undesirably engage the raised apron before the conveyor can clear the plane.

In addition, during operation of the machine, it may be desirable to adjust the rear discharge height of the conveyor. This necessitates pivoting of the conveyor about its intermediate pivot axis, thus changing the clearance space or gap between the apron and conveyor. Any substantial increase in this gap will place undesirable loads on the conveyor mechanism and machine frame, in view of the substantial weight and bulk of the materials being loaded onto the machine and the relative motion of the parts.

SUMMARY OF THE INVENTION

The present invention is directed to a structural concept which solves the aforementioned problems.

It is contemplated that the rear pivot of the apron be constructed to be vertically shiftable through a substantial range above the approach angle. This, combined with the apron angle adjustment mechanism, will selectively change the angular attitude of the apron so that it completely clears the approach plane while not obstructing the conveyor.

Furthermore, the adjustability of angular attitude of the apron makes it possible to maintain the desired gap with the conveyor, no matter what the vertical position of the conveyor front end.

In addition, the dig-in angle of the apron during forward movement of the machine during loading may be quickly adjusted by means of the inventive concept.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
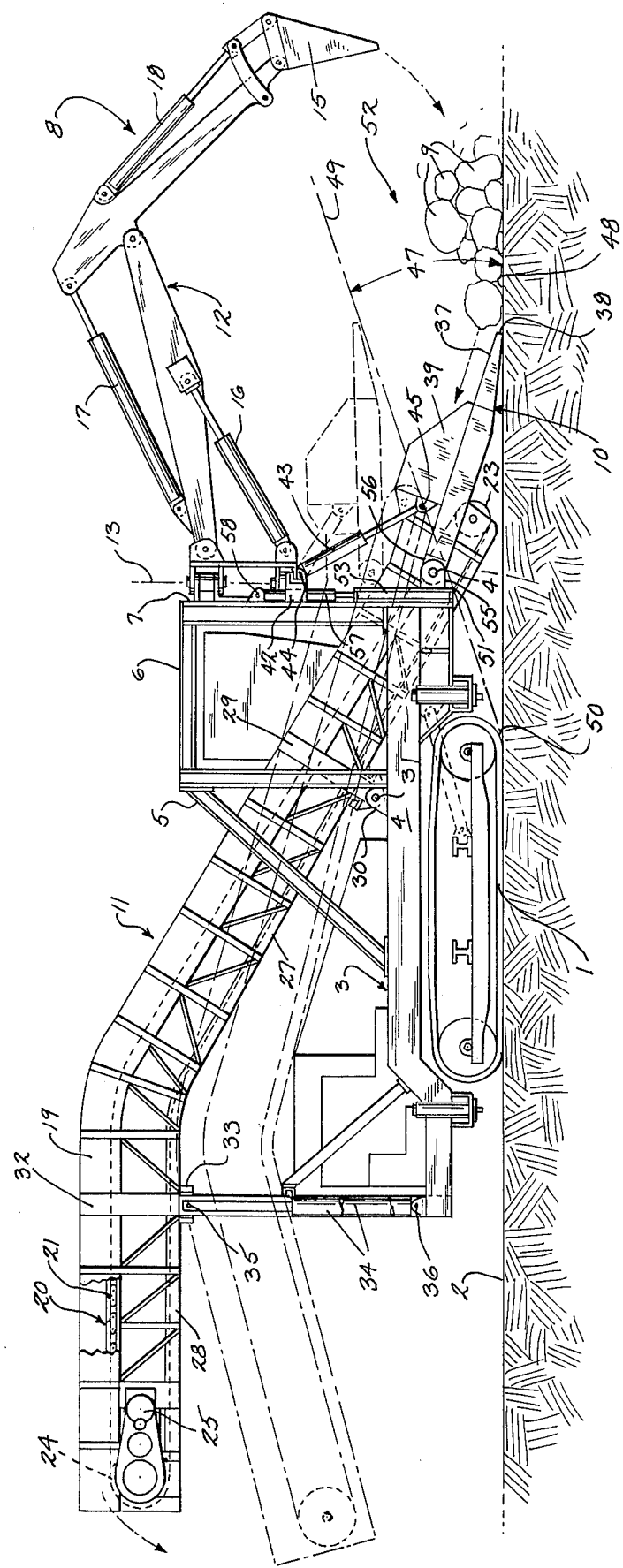
FIG. 1 is a side elevation of a loading and conveying machine constructed in accordance with the invention.

As shown in the drawings, the invention is embodied in a material loading and conveying mechanism having vehicle transport means such as crawler treads 1 which support the machine on the ground 2 and are driven by any suitable means, not shown, to move the machine during loading operations and for travel between operating sites. The front end portion of treads 1 describe an arc and the treads form part of an assembly which supports the machine frame 3 which includes side rails 4, brace elements 5, and a forwardly mounted box 6 which may enclose the operator's cab. A pair of vertical mounting plates 7 are disposed on the front face of box 6.

The machine disclosed herein includes a gathering implement assembly 8 adapted to engage loose rocks 9 or the like and sweep them up an inclined apron 10 where they move onto a conveyor assembly 11 for transport to the rear of the machine.

Figure 2:
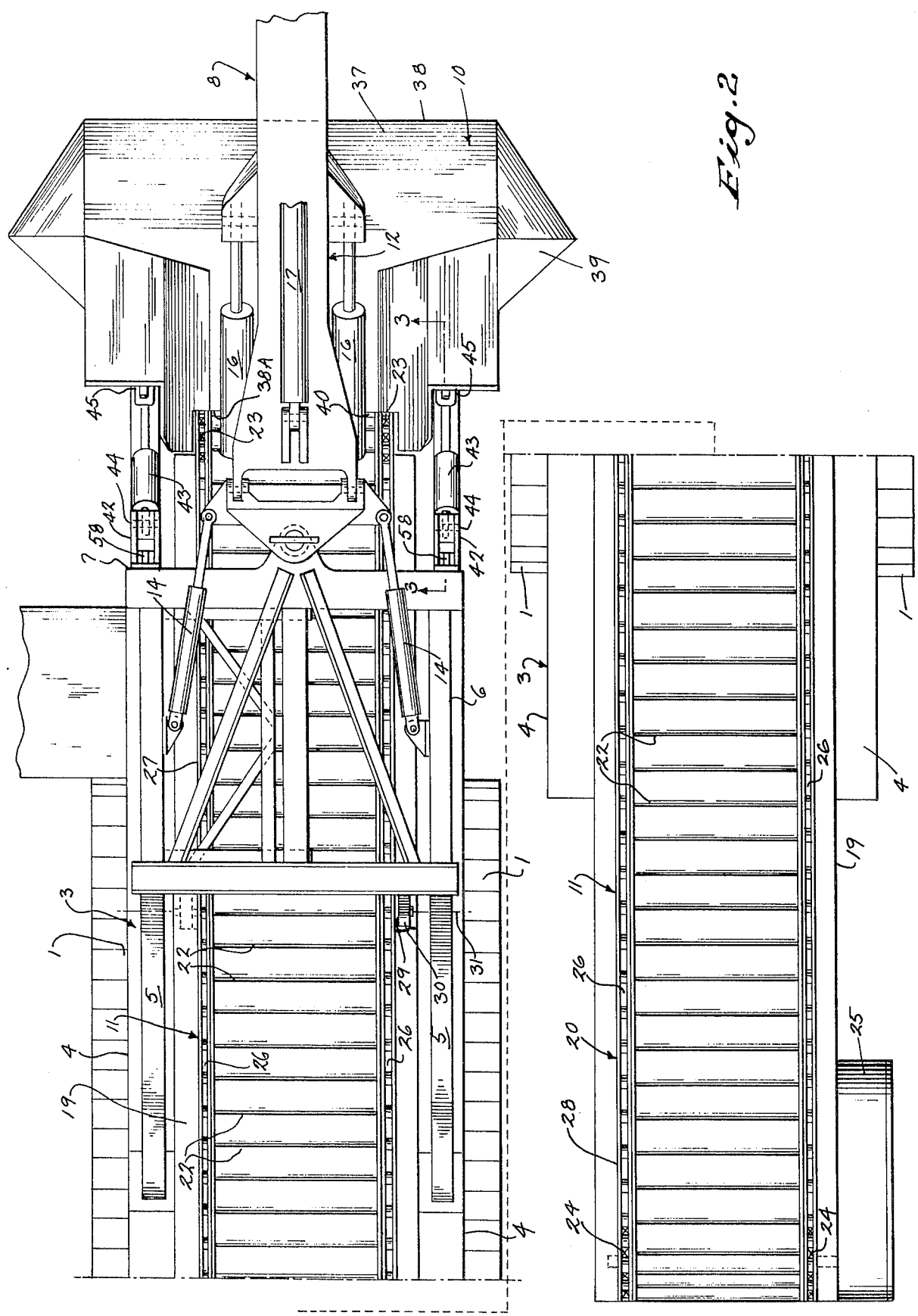
FIG. 2 is a top plan view of the machine.

As best shown in FIGS. 1 and 2, gathering implement assembly 8 forwardly overhangs the machine and generally comprises a boom structure 12 mounted for horizontal swinging pivotal movement about a vertical axis 13, with the swinging control including a pair of swing cylinders 14 being selectively controlled from the operator's cab in the usual well-known manner. Boom structure 12 carries a suitable material handling implement, such as a gathering tool 15, with angular vertical positioning of the elements being accomplished via a series of cylinders 16, 17 and 18, all controllable from the cab in the usual well-known manner.

Conveyor assembly 11 is shown as being elongated and extending from forwardly of frame box 6 to substantially behind the rear frame portion of the machine. Assembly 11 comprises a generally rectangular unitary framework 19 having an endless conveyor belt 20 extending from front to rear. Belt 20 comprises a pair of transversely spaced parallel roller chains 21, joined by conveying elements 22 which serve to move the material rearwardly. The chains of belt 20 are trained around a pair of rotatable front sprockets 23 and a pair of rotatable rear sprockets 24, with a motor 25 for driving the latter. Chains 21 are supported on upper and lower rails 26 extending along the framework, and form upper and lower flights.

Conveyor assembly 11 is shown as having a relatively long forward section 27 of steep inclination, and a shorter rearward section 28 of lesser incline. In fact, as shown in full lines in FIG. 1, section 28 may be disposed substantially horizontal during machine operation.

Conveyor assembly 11 is pivotally mounted for vertical adjustment. For this purpose, a pair of spaced vertical forward struts 29 are mounted to the front section 27 of framework 19 and join with a pair of fixed machine frame brackets 30 for pivoting of the front portion of the assembly about a horizontal axis 31. Additionally, a pair of spaced vertical rearward struts 32 are mounted to the rear section 28 of framework 19 and join, through a cross brace 33 and suitable pivotal connections, with the upper end of a conveyor positioning cylinder 34, as on horizontal axis 35. The lower end of cylinder 34 is pivotally mounted to frame 3, as on horizontal axis 36. Cylinder 34 may be actuated from the cab by any suitable well-known mechanism to selectively adjust the conveyor. The phantom showing in FIG. 1 is for travel position, wherein front section 27 is raised slightly and rear section 28 is lowered substantially.

Apron 10 is adapted to normally ride on the ground ahead of conveyor assembly 11 and is shown as having a central platelike bed 37 with a front edge 38, a narrow rear edge 38A and suitable raised side members 39 which form a channel or throat through which material is forced by forward machine movement and/or gathering implement assembly 8. The transverse rear edge 38A of bed 37 is spaced slightly above the front end of the upper flight of conveyor belt 20 and provides a clearance space or gap 40 for transfer of material from the apron to the conveyor. See FIG. 3. This gap should be kept at a minimum, and is selectively adjustable as will be described.

Figure 3:
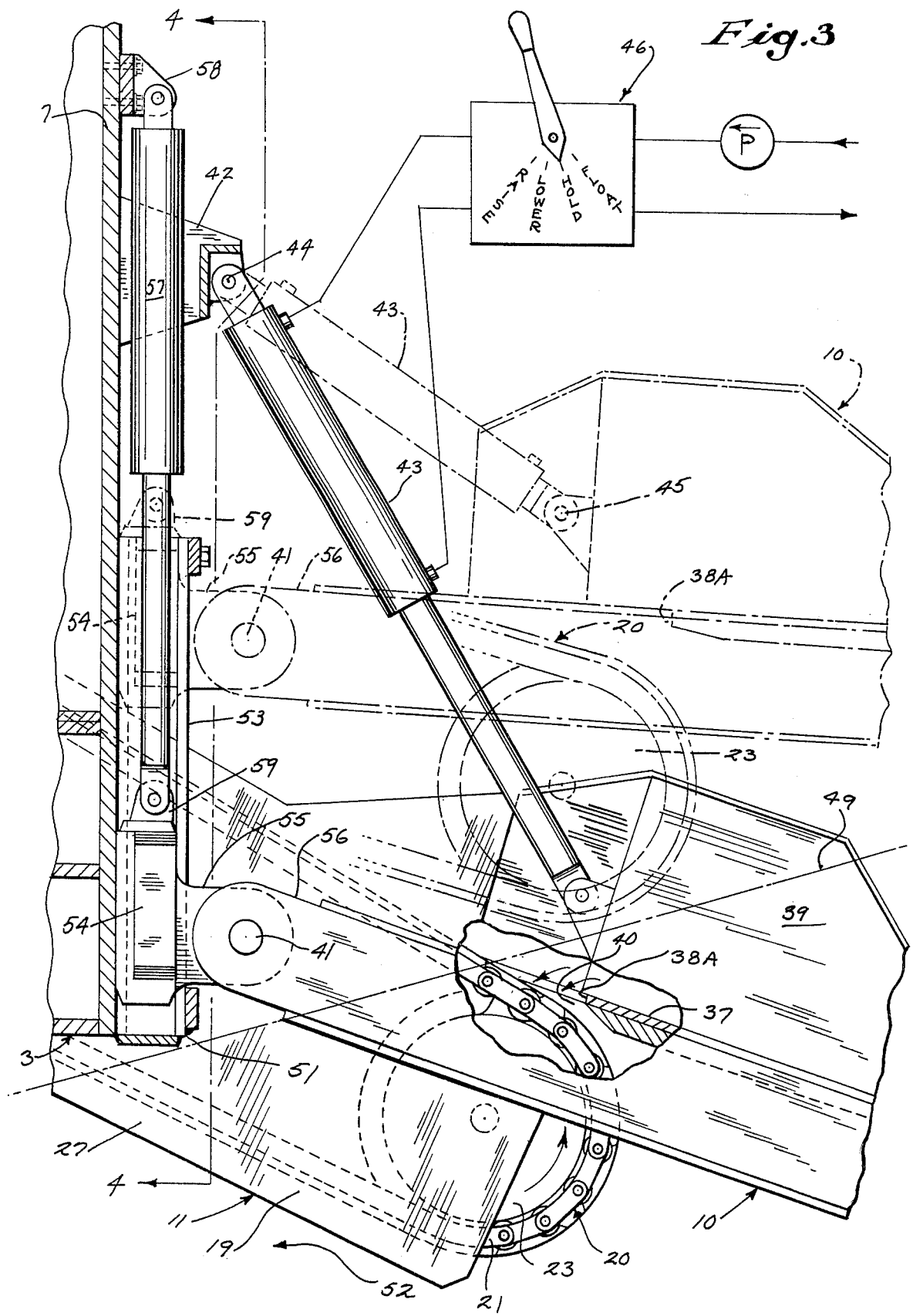
FIG. 3 is an enlarged fragmentary side elevation taken on line 3—3 of FIG. 2, of the apron adjustment mechanism, with parts broken away and sectioned, and showing several positions thereof.

The rear edge of apron 10 is mounted for pivoting about a transverse horizontal axis 41, and means are provided to pivot the apron about said axis. For this purpose, and as best shown in FIGS. 1-3, a pair of brackets 42 are mounted on plates 7, with each bracket being pivotally connected to the upper end of an apron pivot cylinder 43, as at 44. The lower ends of cylinders 43 are pivotally mounted to transversely spaced portions of apron 10, as at axis 45. Cylinders 43 are of the double acting type and are controlled from the cab in any suitable well-known manner to lift and lower the apron, hold it in any desired raised position, or to permit it to float with its front edge 38 on the ground, as shown in full lines in FIG. 1. The cab control panel 46 for the cylinders is shown schematically in FIG. 3.

As best shown in FIG. 1, the construction of the machine provides an "approach angle" 47 defined by a lower plane 48 coextensive with the ground 2, and an upper plane 49 which is tangential to the arc described by the front of treads 1, as at 50, and extends forwardly and upwardly through the lowermost front corner 51 of frame 3. The approach space 52 between planes 48 and 49 must be kept free of machine elements, such as apron 10 and conveyor 11, during machine movement over rough terrain.

During normal operation of the machine on level ground, as shown in FIG. 1, the approach angle problem is of little consequence. Thus, as shown in full lines, conveyor 11 may be pivotally positioned with its front end intersecting approach plane 49 and disposed in space 52. This front end should normally be as low as possible to minimize the distance rocks 9 must be lifted. In addition, during machine operation it is desirable that the pivot 41 of working apron 10 be as low as possible so that the rearward thrust forces on the apron are transmitted to the frame as horizontally as possible. While pivot 41 is disposed above approach plane 49 and space 52, apron 10 itself extends angularly downwardly to the ground, thus also intersecting plane 49 and disposed within space 52. See also FIG. 3.

When it is desired to move the machine in a manner that approach space 52 must be cleared of machine elements, apron pivot cylinders 43 are retracted to raise the apron body upwardly. However, it has been found that when cylinder 34 is retracted to pivotally raise the front end of conveyor 11, the conveyor will engage the apron before the conveyor can clear space 52.

Figure 4:
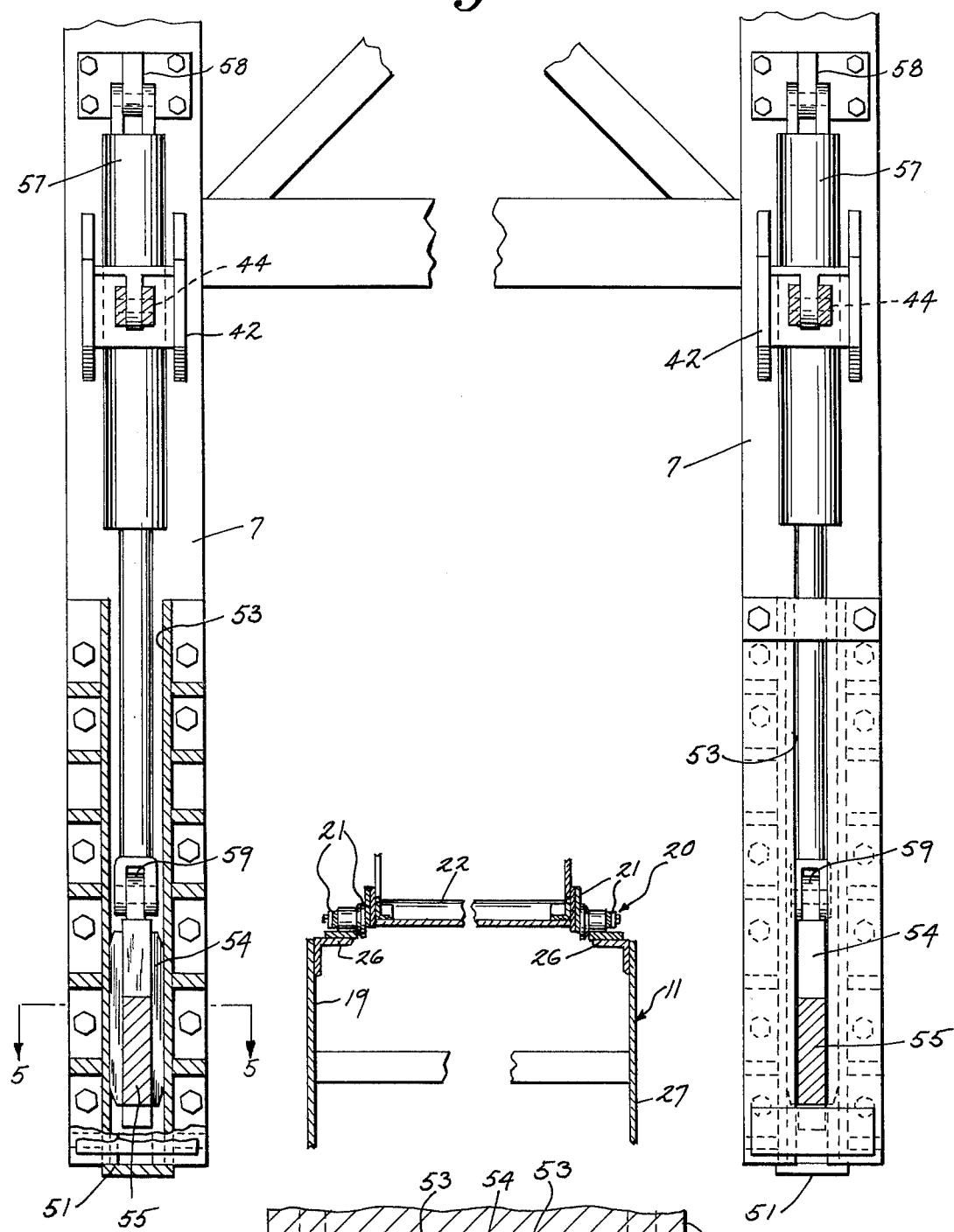
FIG. 4 is a front view of the apron adjustment mechanism, with parts broken away and sectioned, taken on line 4—4 of FIG. 3.
Figure 5:
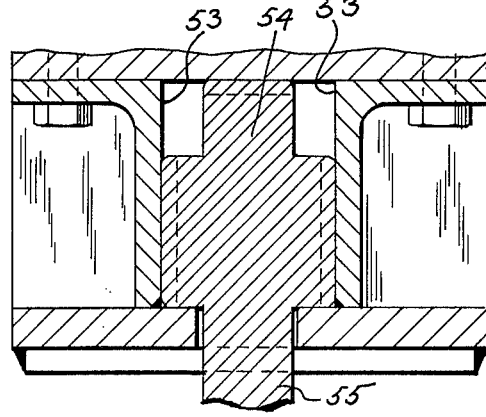
FIG. 5 is a horizontal section taken on line 5—5 of FIG. 4.

To solve this problem, the apron attitude adjustment means includes means to selectively shift the apron pivot axis 41 to a position wherein the apron body will completely clear space 52 and not interfere with the ability of conveyor 11 to also clear said space. For this purpose, and as best shown in FIGS. 3-5, a vertical guide 53 is secured to each mounting plate 7 and extends upwardly from adjacent lower frame corner 51. A follower or slide block 54 is mounted in each guide for vertical travel therein. Each slide block 54 is provided with a forwardly extending ear 55 to which is pivotally attached a corresponding clevis 56 on the rearward portion of apron 10. The connection between these elements defines the apron pivot axis 41. Each slide block 54, and thus axis 41, is vertically shiftable by a motive means such as a shift cylinder 57 which is pivotally mounted at its upper end to a bracket 58 on the respective plate 7, and at its lower end to an ear 59 extending upwardly from slide block 54. Cylinders 57 are actuated from the cab in any suitable well-known way to raise and lower axis 41 and thus the rear of the apron to any of an infinite number of desired positions.

Before the front end of conveyor 11 is raised, not only is apron 10 pivoted upwardly by cylinders 43, but the rear of the apron and axis 41 are raised by shift cylinders 57. The resultant raised positions of both the apron and conveyor are best shown in phantom in FIG.

3. All elements will now be above approach plane 49, leaving no obstructions in space 52.

The described structure has a number of advantages in addition to eliminating interference between the apron and conveyor above the approach space.

During operation of the machine, it may be desirable to adjust the height of the discharge end of the conveyor to accommodate various dump receptacles, other conveyors and the like. As soon as conveyor 11 is pivoted to a new position, the size of gap 40 changes. It may be decreased to the point where edge 38A may be contacted by the conveyor. Or, it may be increased until there is too great a material drop distance. The vertical adjustment mechanism for apron axis 41 provides a means to maintain gap 40 at a desired optimum dimension, no matter what the position of conveyor 11.

In addition, if apron edge 38 should move downwardly below grade, due to a depression in the ground surface, the optimum dimension of gap 40 can be maintained by raising apron axis 41.

Furthermore, in some instances it may be desired to change the dig-in angle of apron 10 as the machine moves forwardly. Changing the angle may assist gathering implement assembly 8 in loading unwieldy rocks and the like onto the machine. This may readily be accomplished by changing the vertical position of apron axis 41, while leaving cylinders 43 in float condition, to thereby change the angular attitude of the apron while its front edge 38 remains on the ground.

While numerous cylinders and associated elements have been shown and described herein, either singly or in pairs, any number of such elements may be utilized without departing from the spirit of the invention.

Various modes of carrying out the invention are contemplated as being within the scope of the following claims particularly pointing out and distinctly claiming the subject matter which is regarded as the invention.

I claim:

1. In a machine for loading and conveying loose material such as rocks and the like;
   a. transport means for supporting and moving said machine on the ground, the front end portion of said transport means describing an arc,
   b. a frame carried by said transport means and extending above and forwardly thereof,
   c. material gathering means mounted to said frame and overhanging the front end thereof,
   d. an elongated inclined conveyor extending from the front toward the rear of the machine for transporting material,
   e. conveyor mounting means disposed on said frame and with said mounting means securing said conveyor for pivotal movement about a first transverse horizontal axis,
   f. an apron disposed at the front of the machine and extending forwardly of said frame and above said conveyor for receipt of material from said gathering means and for transfer of said material to said conveyor,
   g. apron mounting means disposed between the rear portion of said apron and said frame to mount said apron for pivotal movement about a second transverse horizontal axis,
   h. the construction being such that said machine provides a forwardly extending approach space with the ground and with said space defined by a first plane co-extensive with the ground and a second plane extending upwardly and tangential to said arc and forwardly through the lower front corner portion of said frame,
   i. means for pivoting said apron about said second named axis so that the front apron portion is movable between a lowered downwardly inclined position wherein it intersects said second plane and is disposed within said approach space, and a raised position above its said lowered position,
   j. means for pivoting said conveyor about said first-named axis so that the front conveyor end portion is movable between a lowered position wherein it intersects said second plane and is disposed within said approach space, and a raised position wherein it is disposed above said space,
   k. and means separate from said apron pivoting means to selectively adjust the angular attitude of said apron so that it is disposed above said approach space and out of interfering engagement with said conveyor when both said apron and conveyor are in their said raised positions.

2. The machine of claim 1 in which said apron angular attitude adjusting means comprises: means to adjust said apron mounting means and said second-named axis vertically.

3. The machine of claim 2 in which the lowermost adjusted position of said apron mounting means and said second-named axis are disposed above said second plane and said approach space.

4. The machine of claim 2 in which the said conveyor mounting means is disposed intermediate the conveyor ends and is fixed.

5. The machine of claim 1 in which said apron angular attitude adjusting means comprises:
   a. vertically extending guide means secured to the front portion of said frame,
   b. follower means connected to said apron mounting means and disposed for vertical movement along said guide means,
   c. and motive means on said frame and connected to said follower means to actuate the latter to thereby adjust said apron mounting means and said second-named axis vertically.

6. The machine of claim 1 wherein:
   a. said apron includes a rear edge portion disposed above the front end portion of said conveyor and with said portions defining a gap therebetween,
   b. and said apron angular attitude adjustment means also comprises means to selectively adjust the size of said gap at any fixed pivoted position of said conveyor.

7. The machine of claim 6 wherein said gap size adjusting means comprises: means to adjust said apron mounting means and said second-named axis vertically.

8. In a machine for loading and conveying loose material such as rocks and the like:
   a. transport means for supporting and moving said machine on the ground, the front end portion of said transport means describing an arc,
   b. a frame carried by said transport means and extending above and forwardly thereof,
   c. material gathering means mounted to said frame and overhanging the front end thereof,
   d. an elongated inclined conveyor extending from the front toward the rear of the machine for transporting material,
   e. conveyor mounting means disposed on said frame and with said mounting means securing said conveyor for pivotal movement about a first transverse horizontal axis,
f. an apron disposed at the front of the machine and extending forwardly of said frame and conveyor for receipt of material from said gathering means and for transfer of said material to said conveyor,
g. apron mounting means disposed between the rear portion of said apron and said frame to mount said apron for pivotal movement about a second transverse horizontal axis,
h. said apron including a rear edge portion disposed above the front end portion of said conveyor and with said portions defining a gap therebetween,
i. means for pivoting said apron about said second-named axis to raise or lower said apron,
j. means for pivoting said conveyor about said first-named axis to raise or lower the said front end portion thereof,
k. and means to selectively adjust the size of said gap at any fixed pivoted position of said conveyor.

9. The machine of claim 8 wherein said gap size adjusting means comprises: means to adjust said apron mounting means and said second-named axis vertically.

10. The machine of claim 9 wherein said gap size adjusting means comprises:
a. vertically extending guide means secured to the front portion of said frame,
b. follower means connected to said apron mounting means and disposed for vertical movement along said guide means,
c. and motive means on said frame and connected to said follower means to actuate the latter to thereby adjust said apron mounting means and said second-named axis vertically.

11. In a machine for loading and conveying loose material such as rocks and the like:
a. transport means for supporting and moving said machine on the ground,
b. a frame carried by said transport means,
c. material gathering means mounted to the front portion of said frame,
d. an elongated inclined conveyor extending from the front to the rear of the machine,
e. an apron disposed at the front of the machine and extending forwardly from adjacent the front portion of said conveyor for transfer of material from said gathering means to said conveyor,
f. means mounting the rear portion of said apron for pivotal movement about a transverse horizontal axis,
g. means for pivoting said apron about said axis for selective engagement or disengagement of the front apron portion with the ground,
h. and means for adjusting said mounting means and said axis vertically.

12. The machine of claim 11 in which said adjusting means comprises:
a. vertically extending guide means secured to the front portion of said frame,
b. follower means connected to said apron mounting means and disposed for vertical movement along said guide means,
c. and motive means on said frame and connected to said follower means to actuate the latter to thereby adjust said apron mounting means and said axis vertically.

* * * * *